June 24, 1930.  A. I. CROOK  1,768,191

TRAFFIC SIGNAL PROJECTOR

Filed May 11, 1927

Inventor
Alfred I. Crook
by his Attorneys
Howson & Howson

Patented June 24, 1930

1,768,191

UNITED STATES PATENT OFFICE

ALFRED I. CROOK, OF LANSDOWNE, PENNSYLVANIA

TRAFFIC-SIGNAL PROJECTOR

Application filed May 11, 1927. Serial No. 190,458.

This invention relates to traffic signal finding and projecting means; and has for its principal object the provision of a device to enable the ordinary traffic signal light, employed at road intersections and usually placed at an elevation relative to the road bed, above the normal range of vision of the driver of an automobile of either the permanently closed type, or an open type car having its top "up", to be brought into focus and an image thereof projected to a position to be readily viewed by the driver when the automobile is close to the road intersection protected by the signal, without the driver having to move from the normal driving position.

Such a device may be constructed as an accessory, to be attached to existing automobiles or it may be constructed as an integral part of the automobile and furnished as standard equipment, by the automobile manufacturers.

Figure 1:
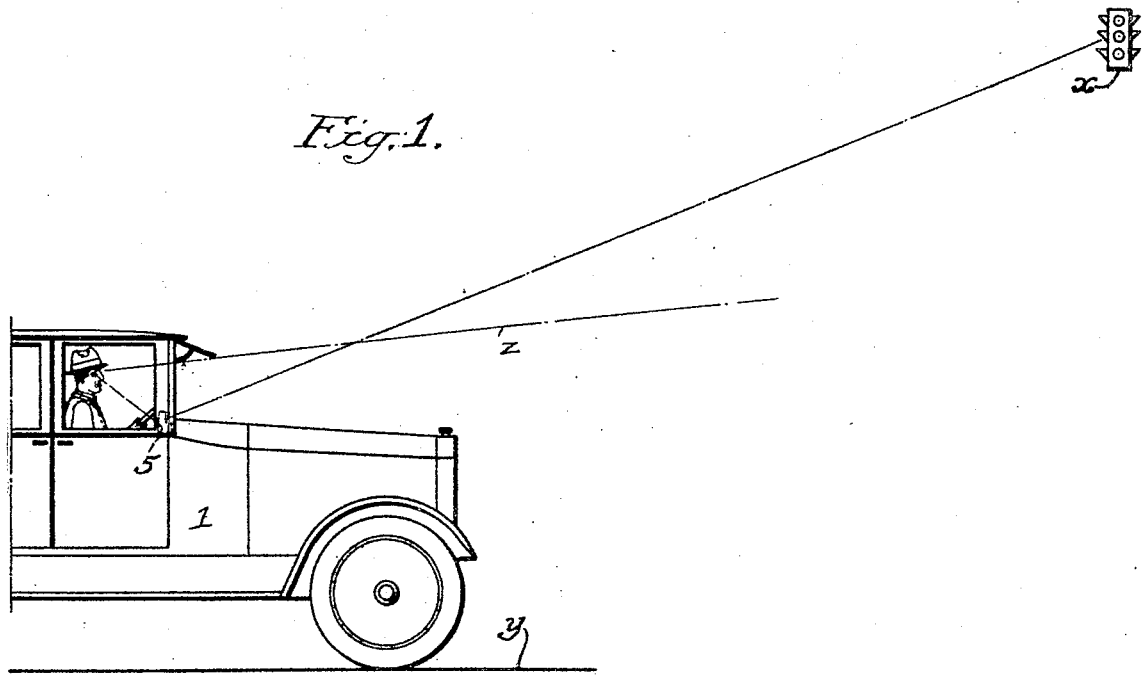
Fig. 1 illustrates an automobile equipped with a signal-projecting device made in accordance with the principles of my invention.

Referring to Fig. 1, a conventional form of traffic signal is illustrated at $x$, as being positioned at an elevation relative to the road bed $y$, which would cause it to be out of the normal range of vision $z$ of the driver of an automobile as the automobile closely approaches the road intersection protected by the signal. An automobile occupying such a relatively close position on the road $y$ is illustrated diagrammatically at 1.

Figure 3:
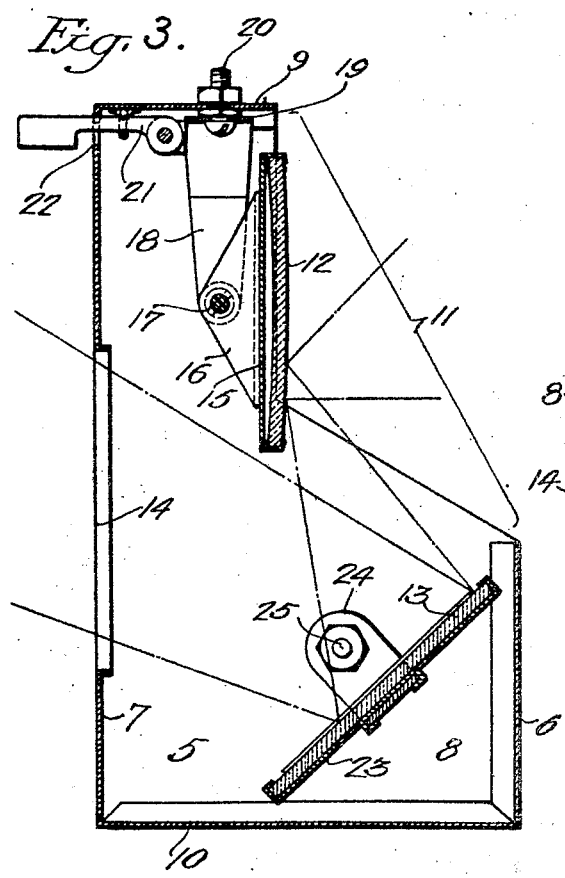
Fig. 3 is a sectional elevation taken on the line 3—3, Fig. 2.
Figure 2:
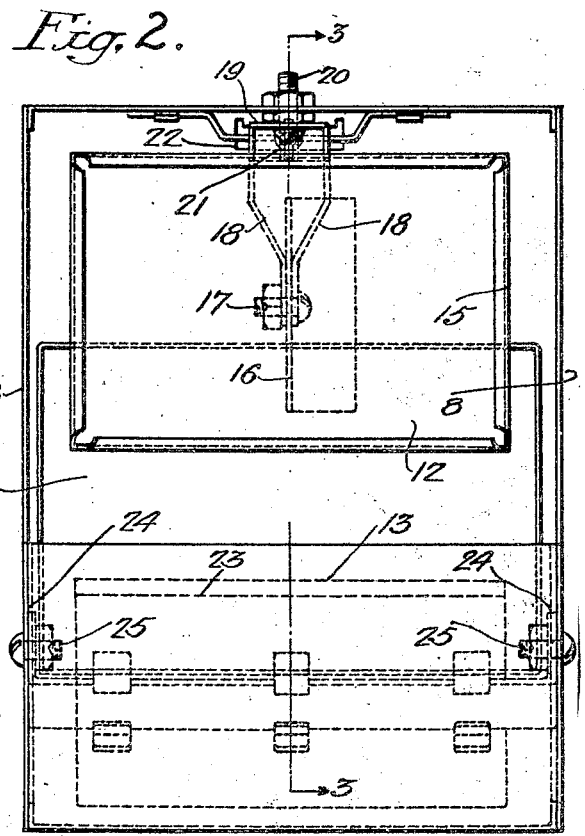
Fig. 2 is a front elevation of the device.

In Figs. 1, 2 and 3, I have illustrated a form of the invention adapted to be secured within the body of an automobile, adjacent the bottom of the windshield thereof. This form of device comprises a casing 5 having a front, back and side walls 6, 7 and 8, 8 respectively, a top 9 and a bottom 10. The front wall 6, the top 9 and side walls 8, 8 are each formed in such a manner as to provide a front opening 11 through which the signal may be "found" and focused on a convexed mirror 12, adjustably mounted in the casing 5 adjacent the opening 11. The signal thus focused is subsequently reflected and projected onto a second mirror 13 which preferably is flat, but may be convexed or concaved if desired, and which is adjustably mounted in the lower portion of the casing 5 and arranged at an angle extending diagonally between the front wall 6 and the bottom 10. The mirror 13 reflects the image in a manner to be readily viewed through an opening 14 formed in the rear wall 7.

The mirror 12 is suitably mounted in a frame 15 having a rearwardly extending projection 16. A pivot bolt 17 extends through the projection 16 and through the arms 18, 18 of a yoke 19. The yoke 19 is pivotally mounted on the under side of the top 9 by means of a pivot bolt 20, and has a third arm 21 attached thereto which extends through a slot 22 in the rear wall 7 of the casing 5. By adjusting the mirror 12 around the pivot 17, its vertical range of focus may be altered, and by turning the mirror around the pivot 20 its horizontal range of focus may be altered to "find" signals which may be placed at the extreme sides of the road. This arrangement eliminates the necessity of an extremely wide horizontal range mirror in which reflection of irrelevant objects and lights might be confusing, besides which a wide range either results in a very small image or requires large bulky apparatus which is not suitable for use within the vehicle.

The mirror 13 is suitably mounted in a frame 23 provided with ears 24, through which and the side walls 8, 8 pivot bolts 25, 25 are adapted to pass. Adjustment of the mirror is effected to project the image, received from the mirror 12, through the opening 14 in the rear wall 7 of the casing.

I claim:

1. A traffic signal projector comprising a casing, having a finding aperture and an observing aperture therein; a convexed mirror adjustably mounted in said casing adjacent said finding aperture; a frame for supporting said convexed mirror; a yoke member for supporting said frame; a pivot member between said frame and said yoke element permitting adjustment of said frame in a vertical plane relative to said yoke; a pivot member between said yoke and said casing, permitting adjustment of said yoke element in a horizontal plane; and a reflecting mirror so located in said casing in a position relative to said finding mirror and said observing aperture as to be capable of receiving a reflection of the signal image from the finding mirror and to reflect said image through said observing aperture.

2. A traffic signal projector comprising a casing, having a finding aperture and an observing aperture therein; a convexed mirror adjustably mounted in said casing adjacent said finding aperture; a frame for supporting said convexed mirror; a yoke member for supporting said frame; a pivot member between said frame and said yoke element permitting adjustment of said frame in a vertical plane relative to said yoke; a pivot member between said yoke and said casing, permitting adjustment of said yoke element in a horizontal plane; and a reflecting mirror so located in said casing in a position relative to said finding mirror and said observing aperture as to be capable of receiving a reflection of the signal image from the finding mirror and to reflect said image through said observing aperture; and means projecting outside said casing for effecting the movement of said finding mirror in the said horizontal plane.

ALFRED I. CROOK.